Fig.7
Fig.8
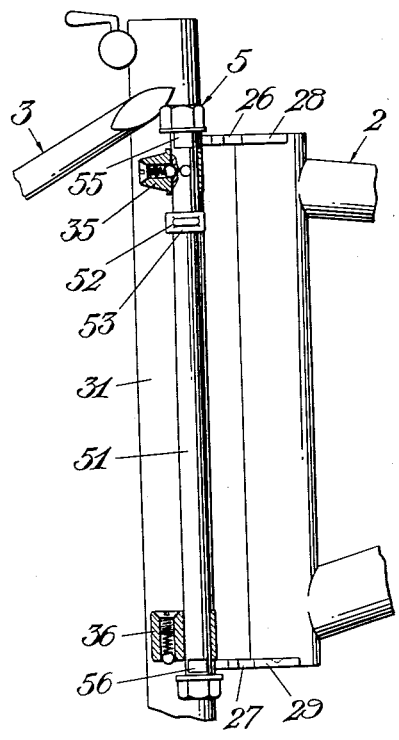
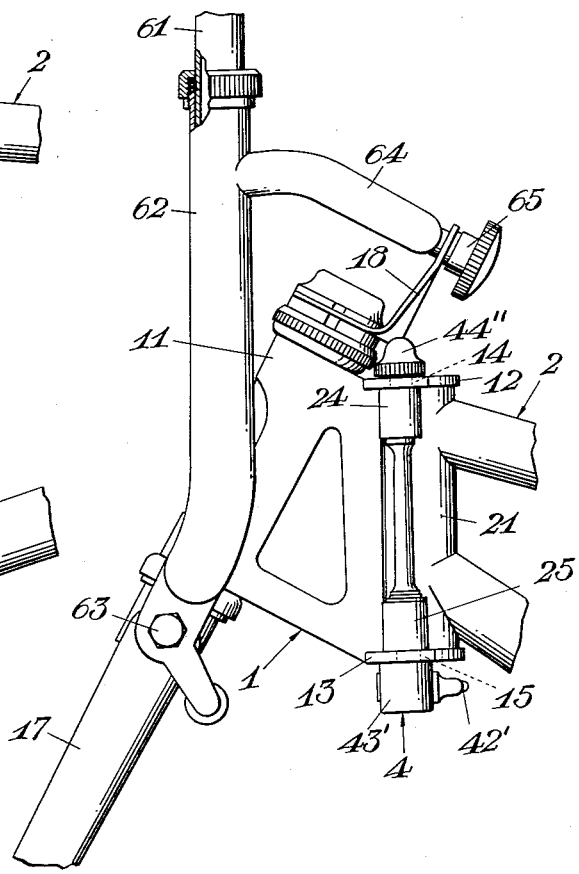

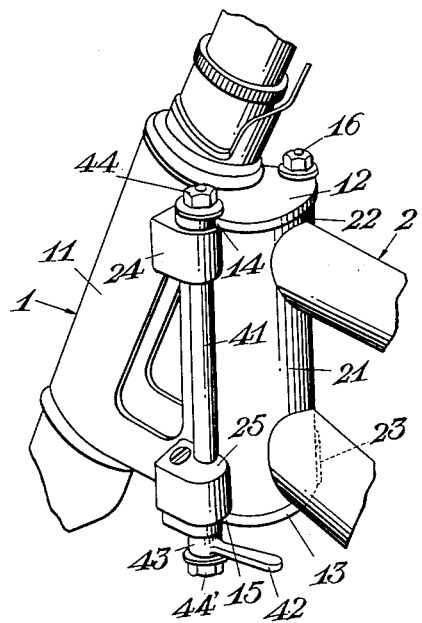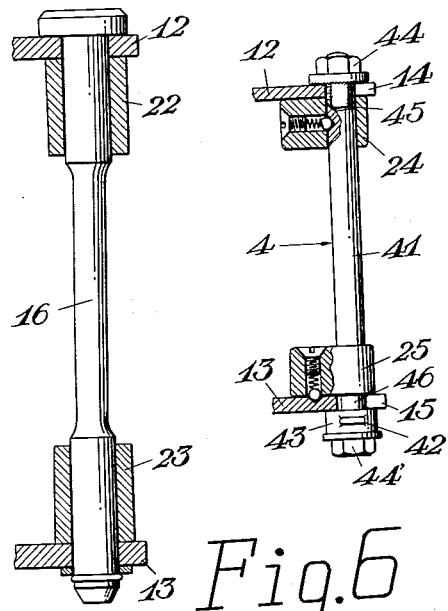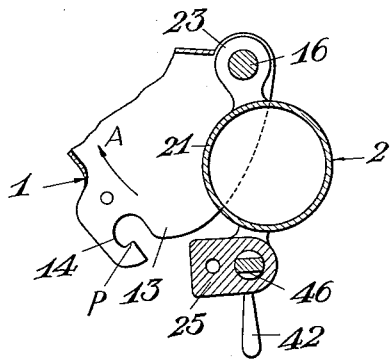

Jan. 2, 1962   SHOJI TANAKA ETAL   3,015,498
FOLDING BICYCLES

Filed Oct. 22, 1958   6 Sheets-Sheet 4

United States Patent Office 3,015,498
Patented Jan. 2, 1962

3,015,498
FOLDING BICYCLES
Shoji Tanaka, 6 Niiyamadori, 3-Chome Nakanoku, and Yoshiyuki Katori, 397 Aotomachi 4-Chome Katsushikaku, both of Tokyo, Japan
Filed Oct. 22, 1958, Ser. No. 768,907
Claims priority, application Japan Oct. 30, 1957
4 Claims. (Cl. 280—278)

This invention relates to an improvement of folding bicycles.

Folding bicycles heretofore in use were subject to the possibility of coming apart unexpectedly due to wear and tear of their engaging portions. Moreover, known bicycles of this type were of comparatively great bulk.

In the present invention, however, these defects have been eliminated. In other words, the objects of this invention are to:

(1) Provide a folding bicycle with improved hinge members which make it possible to unfold the frame assemblies and put the bicycle into a riding position easily and quickly.

(2) Provide a folding bicycle which is adapted to have its frame assemblies held with absolute rigidity and safety when they are secured in the riding position.

(3) Provide a folding bicycle, which is adapted to be released easily and put readily in a folded position, with facilities so that the bicycle can be suitably folded in three parts, that it has no extraordinary projecting part, that thereby it occupies a minimum amount of space when folded so that it may be readily portable, and that moreover it has a nice appearance.

Thus a bicycle according to this invention can be folded easily and in a minimum time. Tests have shown that this bicycle herein described can be assembled and folded in 15 seconds.

A folding bicycle according to this invention comprises a front frame assembly on which is located a handle bar assembly, a center frame assembly, a rear frame assembly with a seat post assembly and pedal driven mechanism, and two hinge members between said front frame assembly and said center assembly and between said center frame assembly and said rear frame assembly, each hinge member comprising upper and lower hinge plates on one frame assembly pivoted on the other frame assembly at one side thereof and at the other side thereof provided with engaging slots, a stud supported on the other frame assembly at one side thereof and hinging said plates to one frame assembly, a locking rod pivotally supported on the other frame assembly at the other side thereof, said rod including portions of reduced dimension at both ends to enter into said slots and adapted for engaging with the same and tightening means for fixing said rod to said plates.

This invention will hereinafter be described more particularly with reference to embodiments thereof shown by way of examples in the accompanying drawings in which:

FIGURE 3 is a perspective view of a portion including a front hinge member.

FIGURE 4 is a side elevational view of a portion including the front stud.

FIGURE 5 is a side elevation view of a portion including the front locking rod.

FIGURE 6 is a sectional plan view of the front hinge member, showing a slight modification and the releasing of the lower front plate from the locking rod.

FIGURE 7 is an opposite side elevational view (relative to FIG. 1) of a portion including a rear locking rod.

FIGURE 8 is a side elevational view of a portion including a modified front hinge member.

FIGURE 9 is a view similar to FIGURE 5.

FIGURE 10 is a side elevational view of a portion including modified rear studs.

Figure 1:
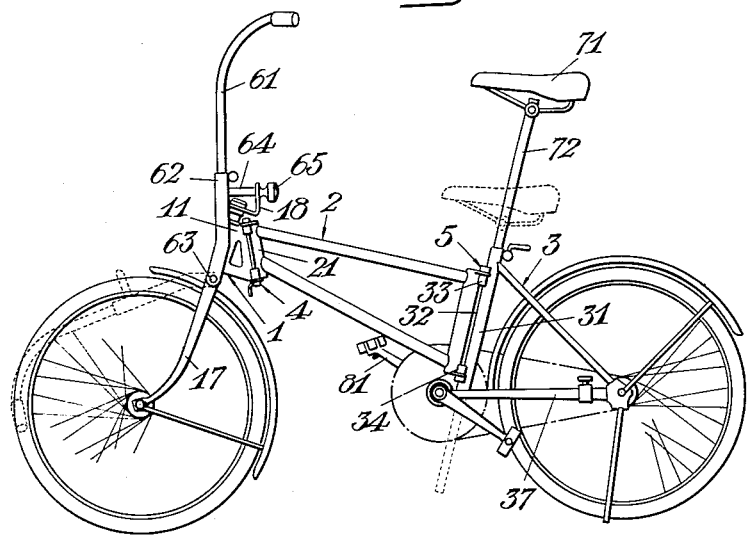
FIGURE 1 is a side elevational view of a folding bicycle in riding position according to this invention, showing the folded position of the handle bars and the saddle as indicated by the broken lines.
Figure 2:
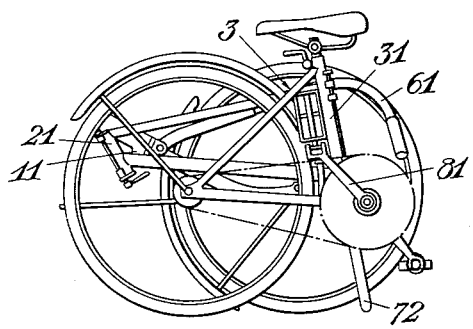
FIGURE 2 is a side elevational view of a folding bicycle in folded position.
Figure 11:
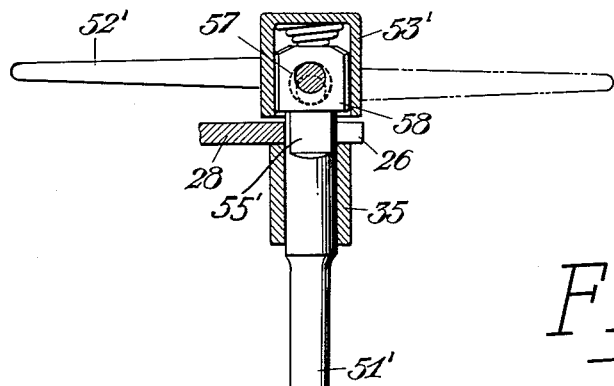
FIGURE 11 is an opposite side elevational view of a portion including the rear locking rod.

In FIGURE 1, a folding bicycle comprises a front frame assembly 1, a center frame assembly 2 and a rear frame assembly 3. These assemblies are adapted to be trifolded as shown in FIGURE 2. Between a front frame assembly 1 and a center frame assembly 2 is provided a front hinge member 4 having a locking rod and between said center frame assembly and said rear frame assembly is provided a rear hinge member 5 having a locking rod.

The front hinge member 4 comprises upper and lower front hinge plates 12 and 13, a front stud 16, locking means and supporting members 22—25.

Referring to FIGURE 3, the upper and lower end of head 11 of front frame assembly 1 are provided with upper and lower front hinge plates 12 and 13, on one side of which slots 14 and 15 are formed, and on the other side of which front stud 16 is mounted (shown in FIG. 4). The front stud 16 is also mounted in supporting members 22 and 23 on one side of the head pipe 21 of the center frame assembly 2. Therefore, the front frame assembly 1 is free to pivot about the front stud 16 on the center frame assembly 2. In the supporting members 24 and 25 on the other side (opposite side relative to the stud 16) of the head pipe 21 is put front locking rod 41, on the lower end of which is fixed turning member 43 with lever 42, on the upper end of which the tightening nut 44 is threaded, and on the upper and lower portions of which cut portions 45 and 46 are formed, said cut portions 45 and 46 being able to engage in the slots 14 and 15 having narrow openings of the upper and lower front plates 12 and 13, respectively. The nut 44' is threaded on the lower end of the locking rod 41. Referring to FIGURE 5, the supporting member 24 is provided with balls held in position by springs and screws, said balls fitting selectively and eccentrically in one of two conical recesses located at 90° angular distance on the side of the locking rod 41 and fixing the assembled and folded positions thereof. When the nut 44 is loosened, the ball fits entirely in the conical recess thereby lowering the locking rod 41. The supporting member 25 is provided with a ball held in position by a spring and screw, said ball fitting in the conical recess on the lower plate 13 and fixing the assembled position thereof.

Firstly, in order to fold the front frame assembly 1 and center frame assembly 2, the lever 42 is to be turned horizontally to the position shown in FIGURE 5 so that the cut portions 45 and 46 may become free from the slots 14 and 15. Then by rotating the front frame assembly 1 with the front stud 16 as its center in the direction of the arrow A (shown in FIG. 6), the front frame assembly 1 can be folded to the right side of the bicycle in the advancing direction thereof, the balls being removed from the conical recesses. Instead of the conical recesses for the assembled position, the portions P shown in FIGURE 6 in solid line can be formed in the slots 14 and 15 of the upper and lower plates 12 and 13 thereby engaging the surface of the cut portions 45 and 46.

In order to assemble the front frame assembly 1 and the center frame assembly 2 so that the bicycle may be put in the riding position, the aforesaid steps taken in the folding of the bicycle should be reversed.

The rear hinge member 5, which is a coupling member between the center frame assembly 2 and the rear frame assembly 3, is similar to said front hinge member 4. The upper and lower ends of the rear pipe of the center frame assembly 2 are provided with the upper and lower rear hinge plates 28 and 29, in which slots 26 and 27 are formed respectively, and the supporting members 33, 34 (FIG. 1), 35 and 36 (FIG. 7) on both sides of the seat post fitting pipe 31 (FIG. 1) of the rear frame assembly 3 support rear stud 32 and rear locking rod 51 which is provided with rotating member 53 having lever 52. By turning the lever 52 and the rear locking rod 51, cut portions 55 and 56 correspond to the narrow openings of the slots 26 and 27 so that the rear frame assembly 3 becomes free to pivot about the rear stud 32 against the center frame assembly 2. Consequently the rear frame assembly 3 can be folded to the left side of the bicycle. By reversing the steps taken in the folding, assembling is effected.

Front and rear hinge members are shown in FIGURES 8, 9, 10 and 11. FIG. 10 illustrates the case whereby no rod is employed between supporting members 33 and 34. With respect to the hinge members 4 and 5, engaging, releasing and tightening can be effected only by the operation of levers 42′ and 52′, respectively. The turning members 43′ (FIG. 9) and 53′ (FIG. 11) are movable longitudinally along the locking rods 41′ and 51′, and the eccentric portions 47 and 57 at the ends of the levers penetrating the turning members 43 and 53′ are fitted to the turning portions 48 and 58 of the locking rods 41′ and 51′. When the locking rods 41′ and 51′ are turned by the levers 42′ and 52′, the narrowed portions 45, 46; 55′, 56′ correspond to the narrow portions of the slots 14, 15; 26, 27, and releasing is effected, or are applied to the portions P of the slots and engaging is effected. Then the levers are turned vertically so as to tighten the locking means. Between the turning portions 48 and 58 of the locking rods 41′ and 51′ and the turning members 43′ and 53′, and between the opposite portions of the locking rods and the nuts 44″ and 54 are inserted springs. In particular, the front locking rod 41′ is resiliently supported by the rubber packing 49 through the washer and clip against the supporting member 25.

Figure 12:
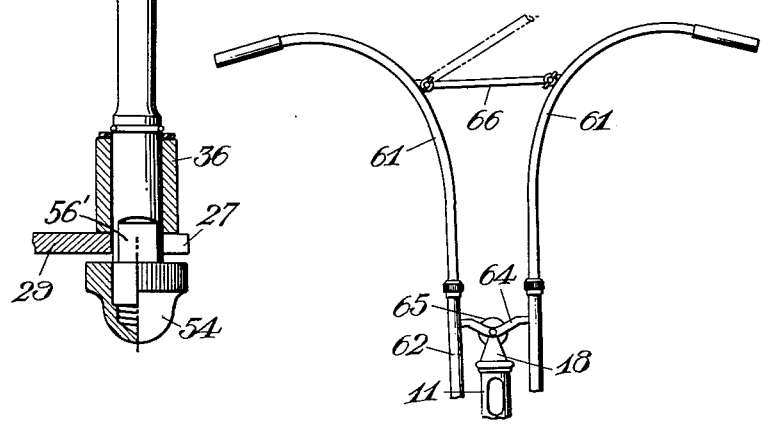
FIGURE 12 is a front elevational view of a portion including handle bars.

When the frame assemblies 1, 2 and 3 are folded handle holder 62 adapted to hold releasably handle bars 61 are turned into the circle of the front wheel as shown in FIGURE 1. In FIGURE 12 the handle holder 62 is pivoted rotatably about the pivot 63 on the front fork 17 and provided with the supporting bridge bar 64 which is supported on the front wheel in the folding position. In order to assemble the handle holder 62 to the riding position, it is turned upward and fixed by the screw knob 65 to the supporting piece 18 on the head 11, and the handle bars 61 and 61 are adjusted to any desired position and connected by the handle bar stay 66. The handle bars and the handle holder can be folded to the folding position by reversing the steps taken in the assembling. In this case the front fork 17 and the handle holder 62 are fixed to each other by positioning the former between the rubber cap covered lugs of the latter.

Figure 13:
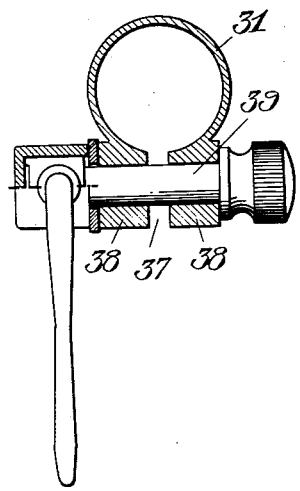
FIGURE 13 is a sectional plan view of a portion including the locking rod for tightening the seat post.

Moreover, seat post 72 supporting saddle 71 is turned to face the rear and lowered into the pipe 31 by turning the lever, as shown in FIGURE 1 by broken line. In FIGURE 13, the upper end of the pipe 31 fitting the seat post 72 is provided with the ears 38 between which the groove 37 is formed, and into which the locking rod 39 penetrates. The nut engages with one end of the locking rod, the other end of which is penetrated by the eccentric portion of the lever through the slidable member. When the lever is turned horizontally, the locking rod allows the ears to be expanded.

Figure 14:
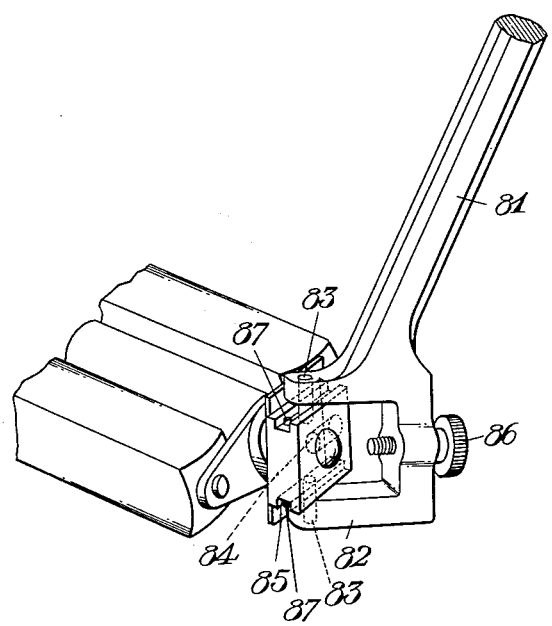
FIGURE 14 is a perspective view of the pedal supporting parts.

Furthermore, the right side pedal of the bicycle is turned to the extended position of crank arm 81 by loosening locking screw. In FIGURE 14 the pedal fitting portion of the crank arm 81 by loosening the locking screw. In FIGURE 14 the pedal fitting portion of the crank arm 81 is forked portion 82 which is provided with a pair of internally projecting pins 83 and 83 engaging with grooves 85 on both sides of pedal supporting member 84 and on the connected portion of which locking screw 86 is provided, engaging with screw hole of the side of the pedal supporting member 84. Stoppers 87 and 87 are provided on both ends of the grooves 85 so as to prevent the pedal supporting member 84 from running off the forked portion 82.

Furthermore, frame locking means are fixed on the front fork 17 and the chain stay 37 thereby maintaining the frames in a folded position.

What we claim is:

1. A folding bicycle comprising front, center and rear frame assemblies, a handle bar mechanism on the front assembly, a seat post and pedal driven mechanism on the rear assembly, hinge members connecting respective pairs of said assemblies; each hinge member comprising: upper and lower hinge plates on one of the assemblies of one of the pairs, said plates being provided with engaging slots at one side thereof, a stud supported on a side of the other assembly of said one pair of pivotally supported on said plates at the other side of the latter, a locking rod rotatably supported on said other assembly on the other side of the latter, said rod including sections of reduced dimension to enter said slots and engage therein, and tightening means for fixing said rod to said plates.

2. A bicycle as claimed in claim 1 wherein said tightening means comprises a lever and an eccentric portion on said lever, said bicycle further comprising a turning member slidable on said rod and adapted to engage one of said plates adjacent the slot therein, said turning member having an opening accommodating said eccentric portion for rotation of the turning member and selective engagement of said one slot.

3. A bicycle as claimed in claim 1 wherein said front assembly comprises a wheel, a shaft supporting said wheel for rotation, a fork pivoted by said shaft to said wheel and a guard covering said wheel; said bicycle further comprising a handle bar holder pivoted to said fork and movable between folded-down and upright positions, a bridge on said holder adapted to abut against said wheel to limit the folding down of said holder, means to engage said bridge with the holder with the latter in upright position to lock said holder in operating position, said handle bar mechanism including handle bars adjustably mounted in said holder, and a stay connected between said bars for bracing the latter.

4. A bicycle as claimed in claim 1 wherein said pedal driven mechanism comprises a crank arm pivoted to said rear assembly and a pedal pivoted to said crank arm and movable between positions whereat it is substantially coplanar with the crank arm and transverse thereto.

References Cited in the file of this patent

UNITED STATES PATENTS

| 2,619,364 | Carson | Nov. 25, 1952 |
| 2,708,587 | Zuck | May 17, 1955 |

FOREIGN PATENTS

| 85,185 | Germany | May 12, 1895 |
| 893,184 | France | Jan. 24, 1944 |